US007161319B2

(12) United States Patent
Ergun et al.

(10) Patent No.: US 7,161,319 B2
(45) **Date of Patent: *Jan. 9, 2007**

(54) MOVABLE BARRIER OPERATOR HAVING SERIAL DATA COMMUNICATION

(75) Inventors: Joseph Ergun, Wood Dale, IL (US); James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/717,263

(22) Filed: Nov. 19, 2003

(65) Prior Publication Data

US 2004/0155771 A1 Aug. 12, 2004

Related U.S. Application Data

(63) Continuation of application No. 09/544,904, filed on Apr. 7, 2000, now Pat. No. 6,737,968.

(60) Provisional application No. 60/128,209, filed on Apr. 7, 1999.

(51) Int. Cl.

| | |
|---|---|
| ***G05B 5/00*** | (2006.01) |
| ***H02H 7/08*** | (2006.01) |
| *H02P 1/00* | (2006.01) |
| *H02P 3/00* | (2006.01) |
| *H02P 7/00* | (2006.01) |

(52) U.S. Cl. ........................ 318/445; 318/466; 318/15; 318/51; 318/62

(58) Field of Classification Search ................ 318/466, 318/266, 286, 468, 480, 445, 16, 51, 62; 49/26, 27, 29, 25; 340/5.71, 5.7, 825.72, 340/545.1, 825.69

See application file for complete search history.

(56) References Cited

U.S. PATENT DOCUMENTS 4,549,092 A 10/1985 Matsuoka et al.

(Continued)

OTHER PUBLICATIONS

International Search Report for PCT/US00/09330 issued by the European Patent Office on Apr. 7, 2000.

*Primary Examiner*—Edgardo San Martin
(74) *Attorney, Agent, or Firm*—Fitch, Even, Tabin & Flannery

(57) ABSTRACT

A wall control unit for a movable barrier operator sends baseband signals over a wire connection to a head unit of a movable barrier operator to command the movable barrier to perform barrier operator functions. The wall control unit has a wall control unit port for connection to the wire connection. A first switch sends a barrier command signal to the head unit commanding the head unit to open or close a movable barrier. A second switch commands the head unit to provide energization to a light source. An infrared detector causes a command signal to be sent to the head unit to control the illumination state of the light source.

16 Claims, 16 Drawing Sheets

U.S. PATENT DOCUMENTS

| | | | | | |
|---|---|---|---|---|---|
| 4,638,433 | A | * | 1/1987 | Schindler | 700/90 |
| 4,771,218 | A | | 9/1988 | McGee | |
| 4,808,995 | A | | 2/1989 | Clark et al. | |
| 4,988,992 | A | * | 1/1991 | Heitschel et al. | 340/825.69 |
| 5,282,337 | A | * | 2/1994 | Duhame et al. | 49/199 |
| 5,285,136 | A | | 2/1994 | Duhame | |
| 5,357,183 | A | | 10/1994 | Lin | |
| 5,475,374 | A | * | 12/1995 | Moore | 340/825.22 |
| 5,589,747 | A | | 12/1996 | Utke | |
| 5,625,980 | A | | 5/1997 | Teich et al. | |
| 5,656,900 | A | | 8/1997 | Michel et al. | |
| 5,684,372 | A | | 11/1997 | Fitzgibbon et al. | |
| 5,751,224 | A | * | 5/1998 | Fitzgibbon | 340/825.72 |
| 5,752,343 | A | | 5/1998 | Quintus | |
| 5,780,987 | A | * | 7/1998 | Fitzgibbon et al. | 318/466 |
| 5,872,513 | A | | 2/1999 | Fitzgibbon et al. | |
| 5,929,580 | A | | 7/1999 | Mullet et al. | |
| 5,933,091 | A | | 8/1999 | McCaslin | |
| 5,950,364 | A | | 9/1999 | Hormann | |
| 5,969,637 | A | | 10/1999 | Doppelt et al. | |
| 6,049,289 | A | * | 4/2000 | Waggamon et al. | 340/5.23 |
| 6,107,765 | A | * | 8/2000 | Fitzgibbon et al. | 318/266 |
| 6,111,374 | A | * | 8/2000 | Fitzgibbon et al. | 318/282 |
| 6,172,475 | B1 | * | 1/2001 | Fitzgibbon et al. | 318/266 |
| 6,181,095 | B1 | | 1/2001 | Telmet | |
| 6,326,754 | B1 | | 12/2001 | Mullet et al. | |
| 6,388,559 | B1 | | 5/2002 | Cohen | |
| RE37,784 | E | | 7/2002 | Fitzgibbon et al. | |
| 6,624,605 | B1 | | 9/2003 | Powder et al. | |
| 6,710,564 | B1 | * | 3/2004 | Shibuya et al. | 318/439 |
| 6,757,583 | B1 | * | 6/2004 | Giamona et al. | 700/189 |
| 6,864,646 | B1 | * | 3/2005 | Rahman et al. | 318/41 |
| 6,919,702 | B1 | * | 7/2005 | Szulyk | 318/599 |
| 7,002,312 | B1 | * | 2/2006 | Wojciak, Jr. | 318/452 |

* cited by examiner 14
62
52
24
60
62
18
20
78
10
26
28
22
30
16
32
78
12
20
53
53

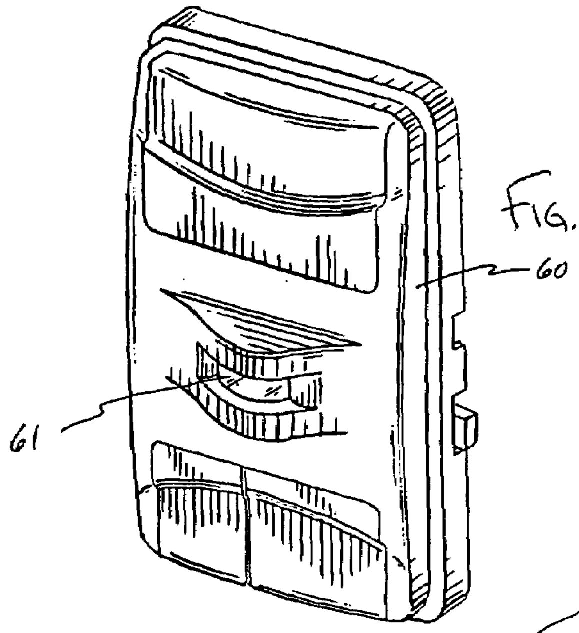
FIG. 5
FIG. 6
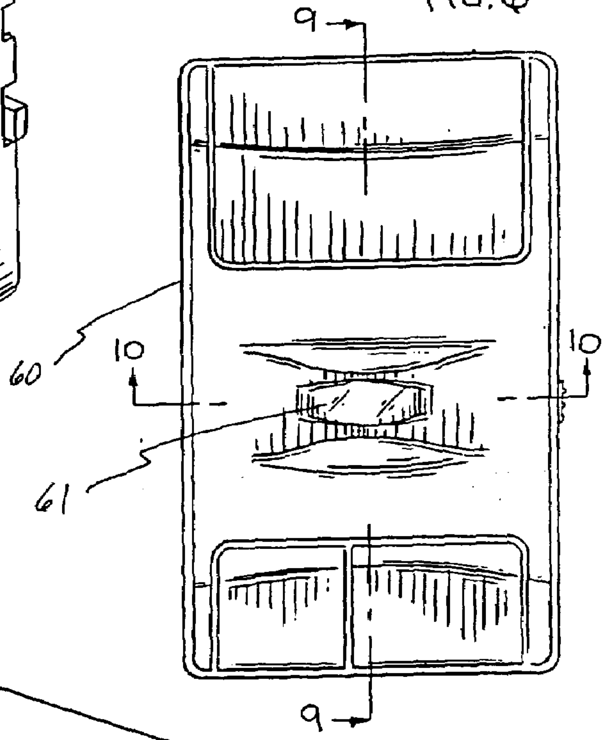
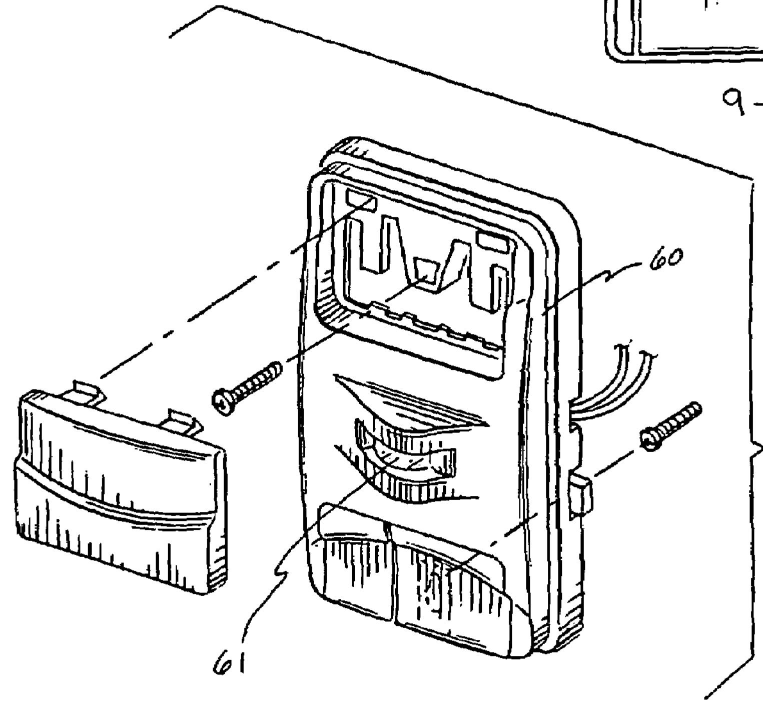
FIG. 11

MOVABLE BARRIER OPERATOR HAVING SERIAL DATA COMMUNICATION

CROSS REFERENCE TO RELATED APPLICATION

This application is a continuation of application Ser. No. 09/544,904 filed Apr. 7, 2000, now U.S. Pat. No. 6,737,968, which claims the benefit of provisional application 60/128,209 filed Apr. 7, 1999.

BACKGROUND OF THE INVENTION

The invention relates in general to movable barrier operators and in particular to movable barrier operators such as garage door operators or gate operators which include passive infrared detectors associated with them for detecting the presence of a person or other high temperature object for controlling a function of the movable barrier operator such as illumination.

It has been known to use pyroelectric infrared detectors or passive infrared (PIR) detectors for the detection of a person in a particular vicinity. For instance, it is well known that pyroelectric infrared detectors can be used in combination with illumination lamps, carriage lamps, spot lamps and the like to form a low cost home security system. The pyroelectric infrared detector typically has a plurality of segments. One or more of the segments may be actuated by infrared radiation focused thereon by a Fresnel lens positioned in front of the PIR detector. The pyroelectric detector provides an output signal when a change occurs in the potential level between one element and another element in the array. Such an infrared detected voltage change indicates that a warm object radiating infrared radiation, typically a person, is moving with respect to the detector. The detectors to provide output signals upon receiving infrared radiation in about the ten micron wavelength range. The micron infrared radiation is generated by a body having a temperature of about 90° F., around the temperature of a human body (98.6° F.).

It is also known that garage door operators or movable barrier operators can include a passive infrared detector associated with the head unit of the garage door operator. The passive infrared detector, however, needed some type of aiming or alignment mechanism associated with it so that it could be thermally responsive to at least part of the garage interior. The detectors were connected so that upon receiving infrared energy from a moving thermal source, they would cause a light associated with the garage door operator to be illuminated.

It was known in the past to use timers associated with such systems so that if there were no further thermal signal, the light would be shut off after a predetermined period. Such units were expensive as the passive infrared detector had to be built into the head unit of the garage door operator. Also, the prior PIR detectors were fragile. During mounting of the head unit to the ceiling of the garage a collision with the aiming device associated with the passive infrared detector might damage them. The ability to aim the detection reliably was deficient, sometimes leaving blank or dead spots in the infrared coverage.

Still other operators using pivoting head infrared detectors required that the detector be retrofitted into the middle of the output circuit of a conventional garage door operator. This would have to have been done by garage door operator service personnel as it would likely involve cutting traces on a printed circuit board or the like. Unauthorized alteration of the circuit board by a consumer might entail loss of warranty coverage of the garage door operator or even cause safety problems.

What is needed then is a passive infrared detector for controlling illumination from a garage door operator which could be quickly and easily retrofitted to existing garage door operators with a minimum of trouble and without voiding the warranty.

SUMMARY OF THE INVENTION

A passive infrared detector for a garage door operator includes a passive infrared detector section connected to a comparator for generating a signal when a moving thermal or infrared source signal is detected by the passive infrared detector. The signal is fed to a microcontroller. Both the infrared detector and the comparator and the microcontroller are contained in a wall control unit. The wall control unit has a plurality of switches which would normally be used to control the functioning of the garage door operator and are connected in conventional fashion thereto.

The PIR detector is included with the switches for opening the garage door, closing the garage door and causing a lamp to be illuminated. The microcontroller also is connected to an illumination detection circuit, which might typically comprise a cadmium sulphide (CdS) element which is responsive to visible light. The CdS element supplies an illumination signal to an ambient light comparator which in turn supplies an illuminator level signal to the microcontroller. The microcontroller also controls a setpoint signal fed to the comparator. The setpoint signal may be adjusted by the microcontroller according to the desired trip point for the ambient illumination level.

The microcontroller also communicates over the lines carrying the normal wall control switch signals with a microcontroller in a head unit of the garage door operator. The wall control microcontroller can interrogate the garage door operator head unit with a request for information. If the garage door operator head unit is a conventional unit, no reply will come back and the wall control microcontroller will assume that a conventional garage door operator head is being employed. In the event that a signal comes back in the form of a data frame which includes a flag that is related to whether the light has been commanded to turn on, the microcontroller can then respond and determine in regard to the status of the infrared detector and the ambient light whether the light should stay on or be turned off.

In the event that a conventional garage door operator head is used, the microcontroller can, in effect, create a feedback loop with the head unit by sending a light toggling signal to the microcontroller in the head unit commanding it to change the light state. If the light turns on, the increase in illumination is detected by the cadmium sulphide sensor and so signaled to the microcontroller head allowing the light to stay on. If, in the alternative, the light is turned off and the drop in light output is detected by the cadmium sulphide detector, the wall control microcontroller then retoggles the light, switching it back on to cause the light to stay on for a full time period allotted to it, usually two-and-one-half to four-and-one-half minutes.

It is a principal aspect of the present invention to provide a quickly and easily retrofitted passive infrared detector for controlling the illumination of a garage door operator through conventional signaling channels.

It is another aspect of the instant invention to provide a garage door operator having a passive infrared detector which passive infrared detector can-control a variety of garage door operators.

Other aspects and advantages of the present invention will become obvious to one of ordinary skill in the art upon a perusal of the following specification and claims in light of the accompanying drawings.

BRIEF DESCRIPTION OF THE DRAWINGS

FIG. 5 is a perspective view of the wall control;

FIG. 6 is a front elevational view of the wall control shown in FIG. 6;

FIG. 11 is a partially exploded perspective view of the wall control shown in FIG. 5.

DETAILED DESCRIPTION OF THE PREFERRED EMBODIMENT

Figure 1:
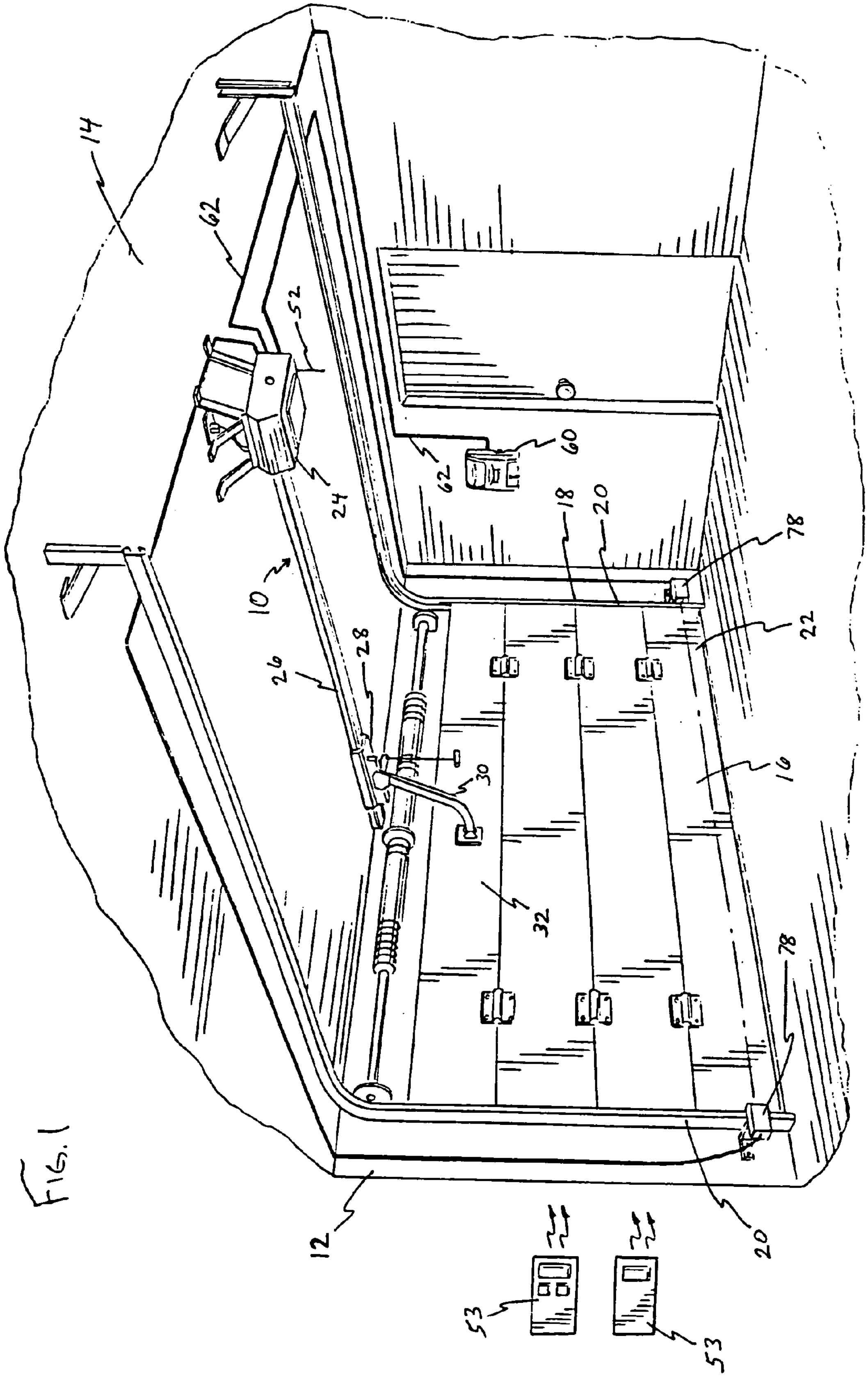
FIG. 1 is a perspective view of a garage including a movable barrier operator, specifically a garage door operator, having associated with it a passive infrared detector in a wall control unit and embodying the present invention.

Referring now to drawings and especially to FIG. 1, a movable barrier operator embodying the present invention is shown therein and generally identified by reference numeral 10. The movable barrier operator, in this embodiment a garage door operator 10, is positioned within a garage 12. More specifically, it is mounted to a ceiling 14 of the garage 12 for operation, in this embodiment, of a multipanel garage door 16. The multipanel garage door 16 includes a plurality of rollers 18 rotatably confined within a pair of tracks 20 positioned adjacent to and on opposite sides of an opening 22 for the garage door 16.

The garage door operator 10 also includes a head unit 24 for providing motion to the garage door 16 via a rail assembly 26. The rail assembly 26 includes a trolley 28 for releasable connection of the head unit 24 to the garage door 16 via an arm 30. The arm 30 is connected to an upper portion 32 of the garage door 16 for opening and closing it. The trolley 28 is connected to an endless chain to be driven thereby. The chain is driven by a sprocket in the head unit 24. The sprocket acts as a power takeoff for an electric motor located in the head unit 24.

Figure 2:
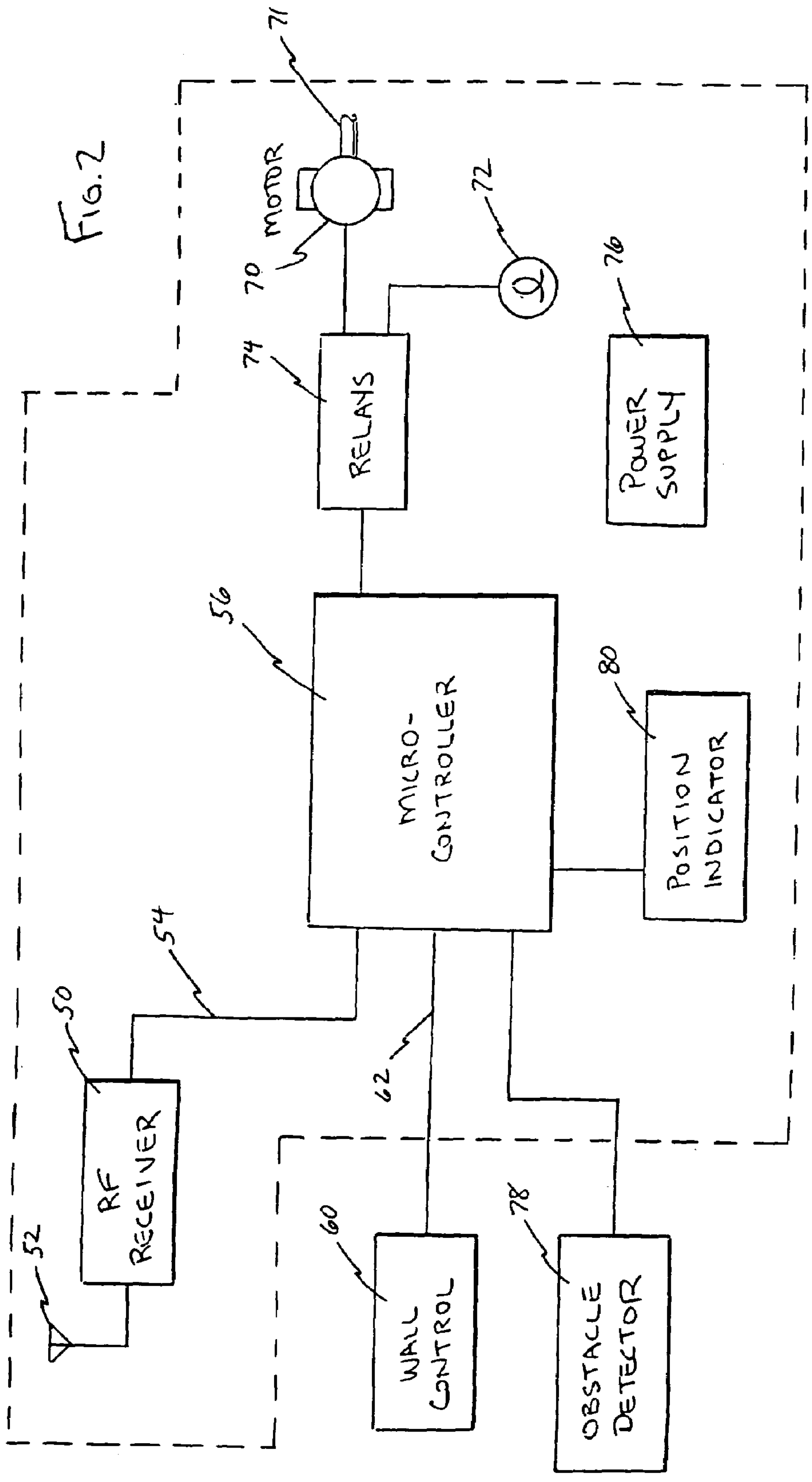
FIG. 2 is a block diagram showing the relationship between major electrical systems of a portion of the garage door operator shown in FIG. 1.

The head unit 24 includes a radio frequency receiver 50, as may best be seen in FIG. 2, having an antenna 52 associated with it for receiving coded radio frequency transmissions from one or more radio transmitters 53 which may include portable or keyfob transmitters or keypad transmitters. The radio receiver 50 is connected via a line 54 to a microcontroller 56 which interprets signals from the radio receiver 50 as code commands to control other portions of the garage door operator 10.

Figure 3A:
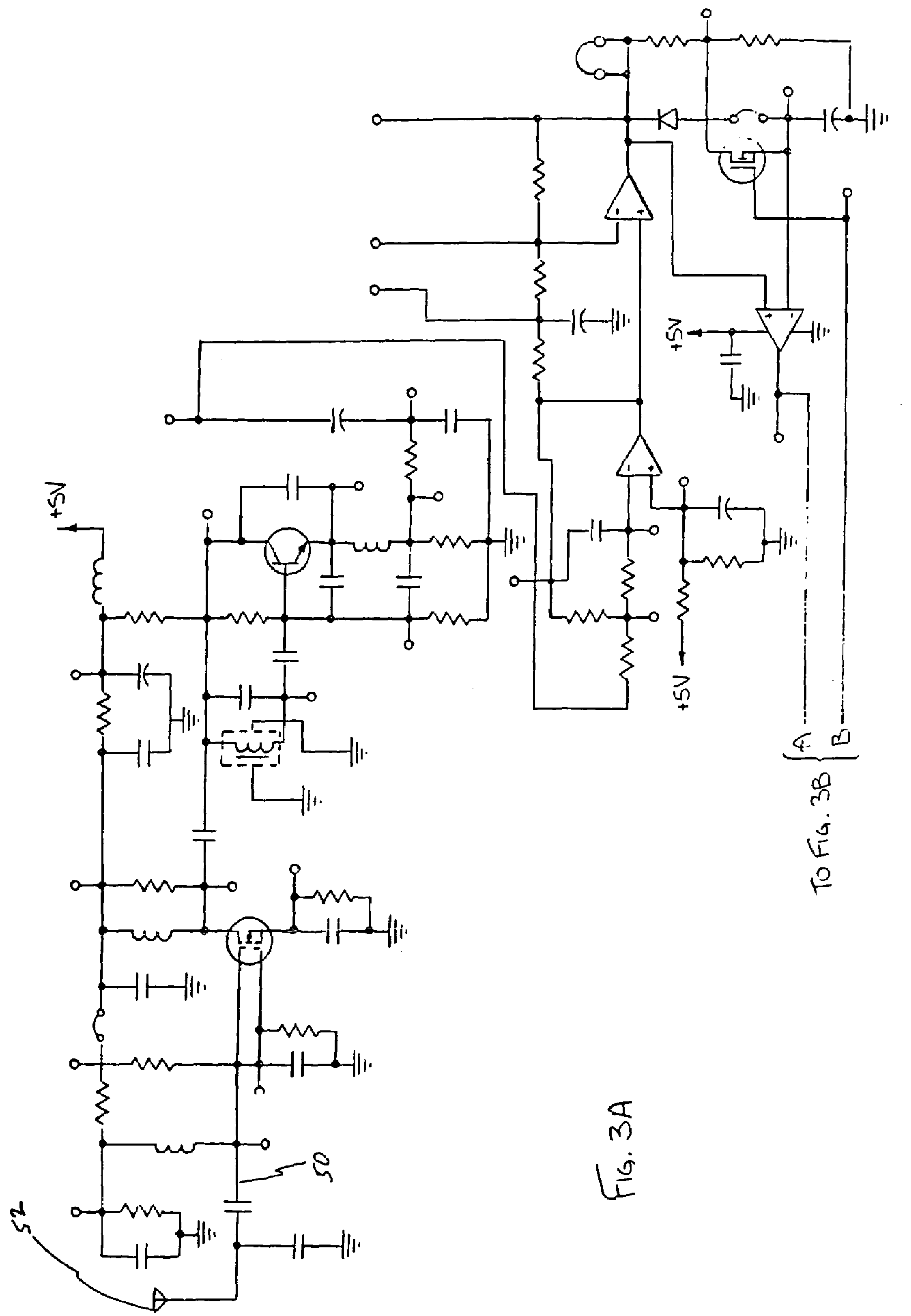
FIGS. 3A–C are schematic diagrams of a portion of the electrical system shown in FIG. 2.
Figure 3B:
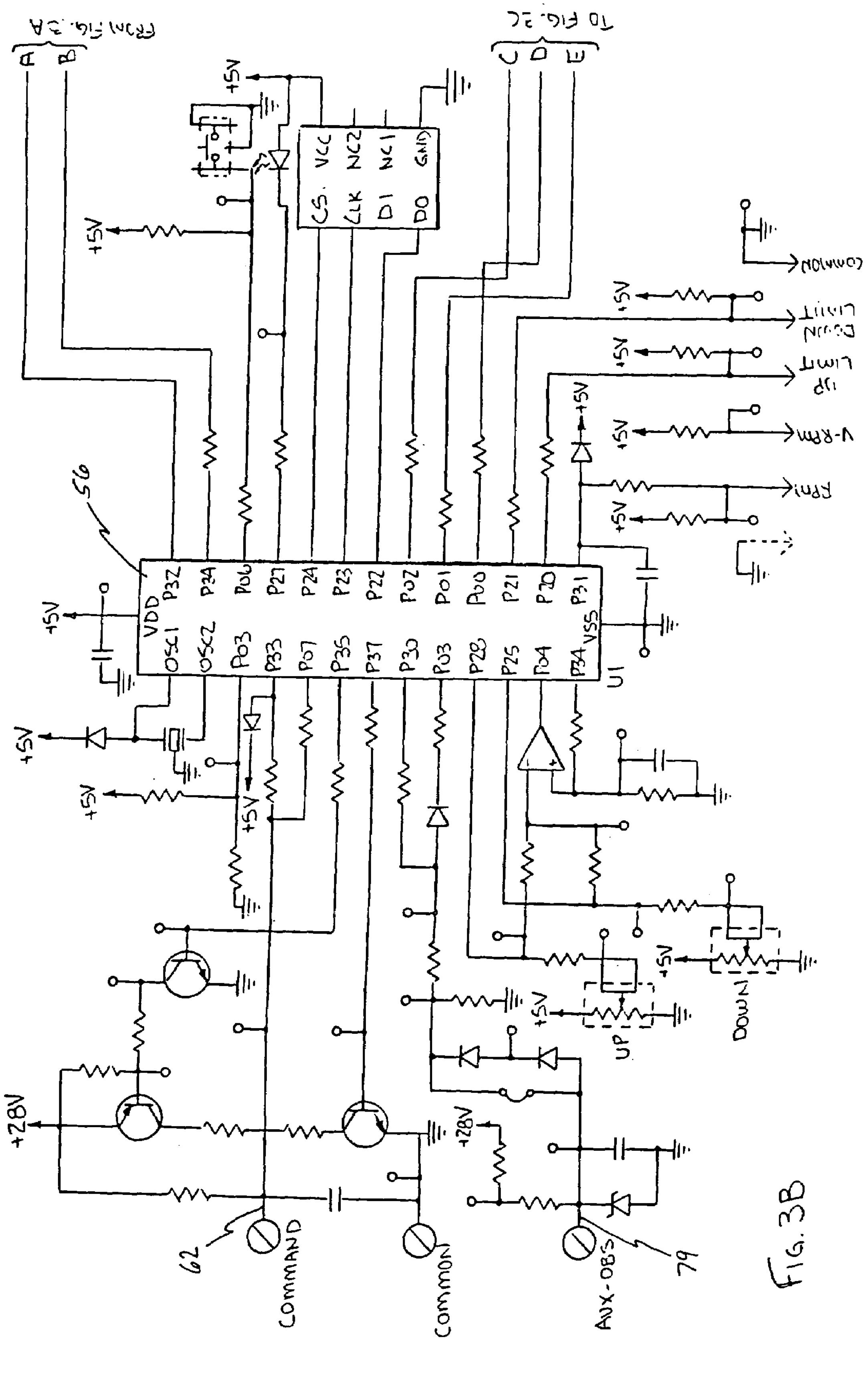
Figure 3C:
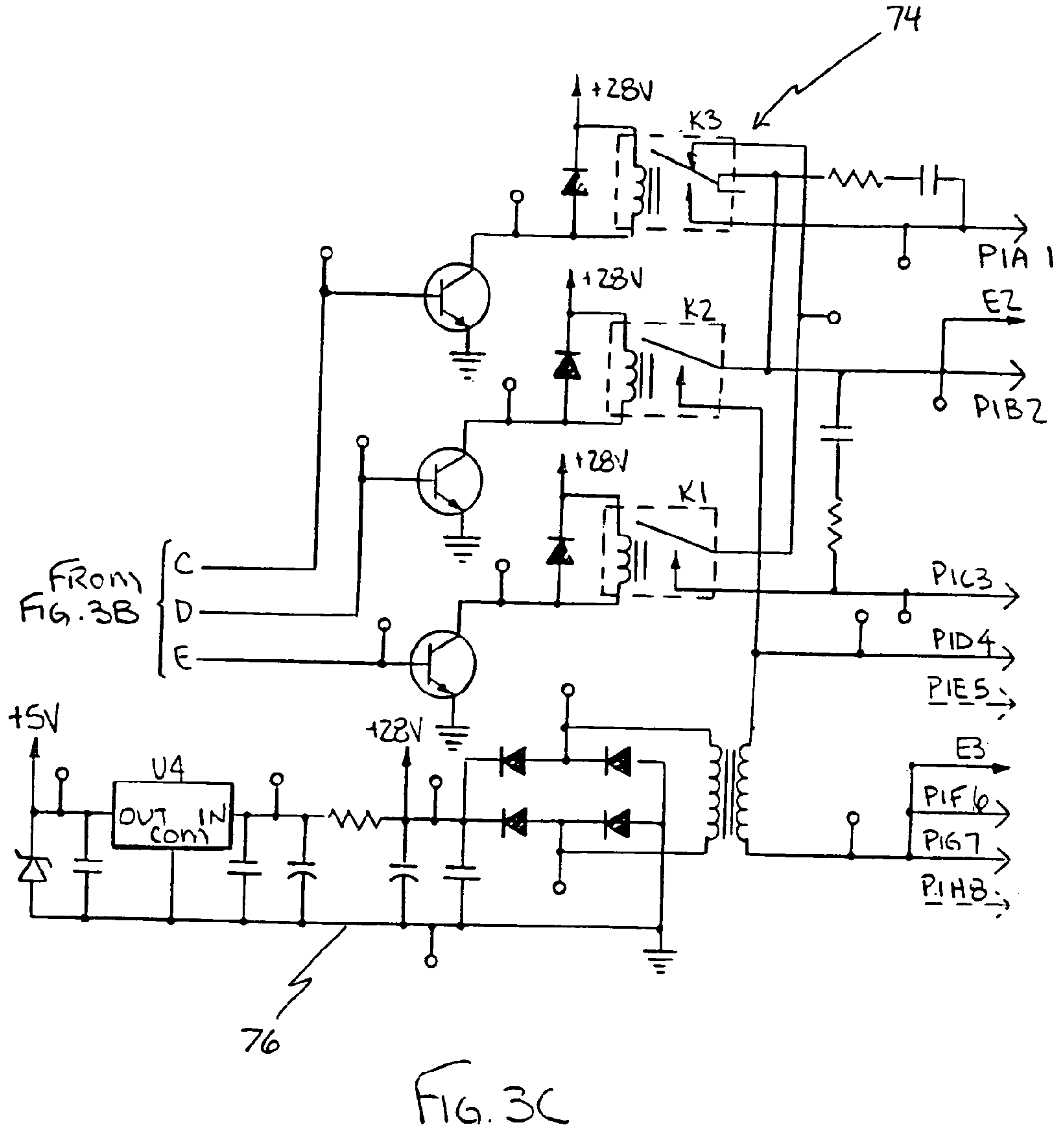

A wall control unit 60 embodying the present invention, as will be seen in more detail hereafter, communicates over a line 62 with the head unit microcontroller 56 to effect control of a garage door operator motor 70 and a light 72 via relay logic 74 connected to the microcontroller 56. The entire head unit 24 is powered from a power supply 76. In addition, the garage door operator 10 includes an obstacle detector 78 which optically or via an infrared pulsed beam detects when the garage door opening 22 is blocked and signals the microcontroller 56 of the blockage. The microcontroller 56 then causes a reversal or opening of the door 16. In addition, a position indicator 80 indicates to the head unit microcontroller 56, through at least part of the travel of the door 16, the door position so that the microcontroller 56 can control the close position and the open position of the door 16 accurately. FIGS. 3A–C are schematic diagrams of a portion of the electrical system shown in FIG. 2.

Figure 4:
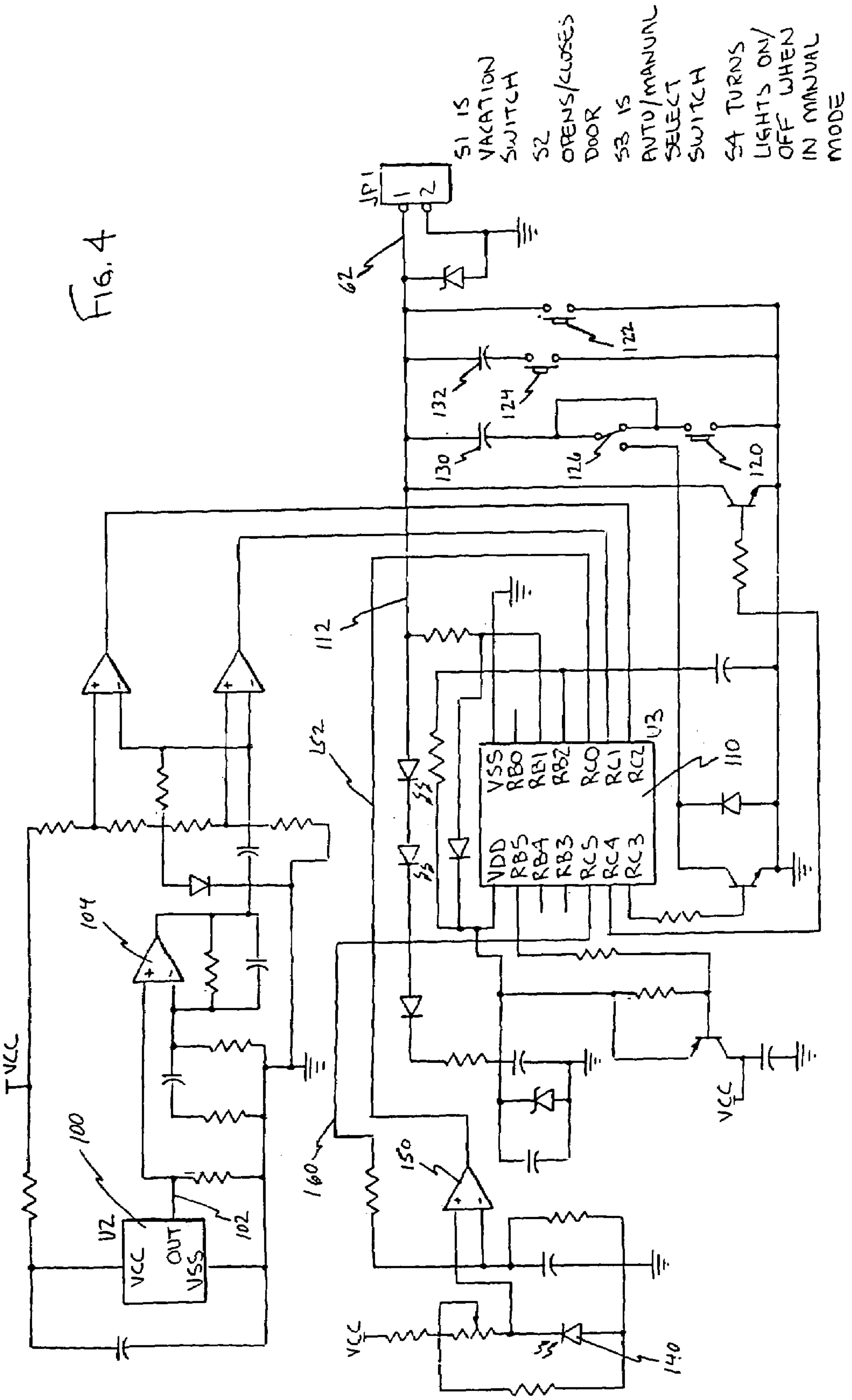
FIG. 4 is a schematic diagram of the wall control including the passive infrared detector.
Figure 7:
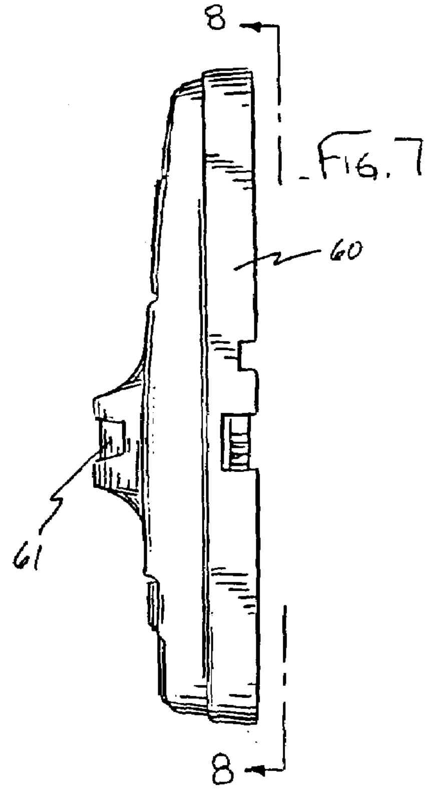
FIG. 7 is a side view of the wall control shown in FIG. 6.
Figure 8:
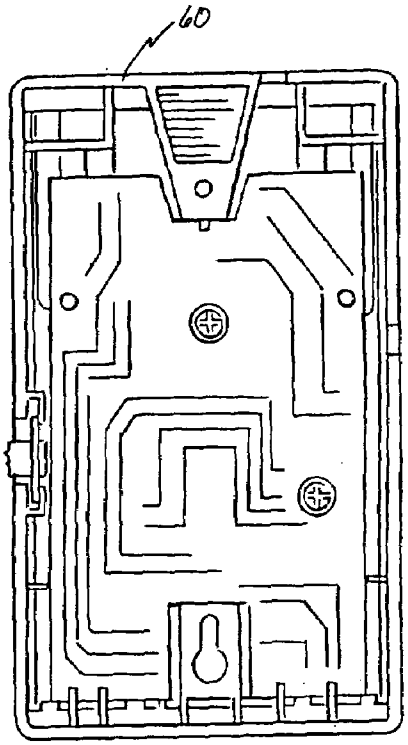
FIG. 8 is a rear elevational view of the wall control shown in FIG. 6.
Figure 9:
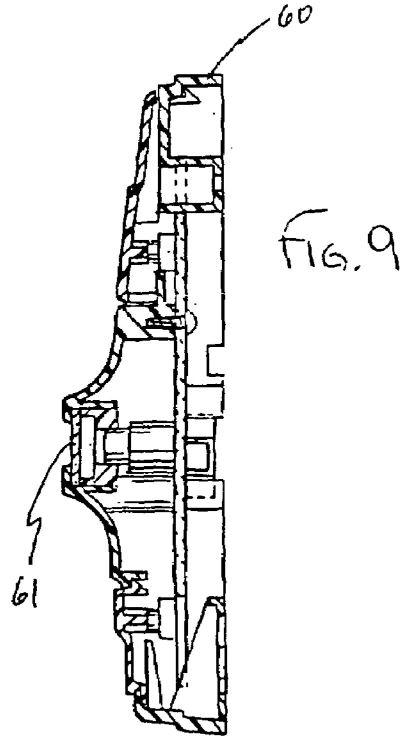
FIG. 9 is a side view, shown in cross section, of the wall control in FIG. 7.
Figure 10:
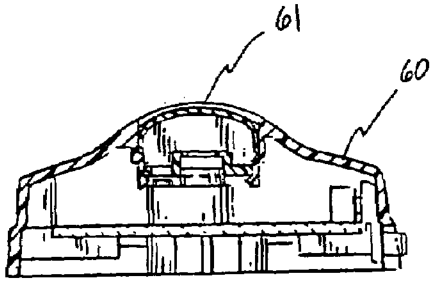
FIG. 10 is a plan view, shown in cross section, of the wall control.

The wall control 60, as may best be seen in FIG. 4, includes a passive infrared sensor 100 having an output line 102 connected to a differential amplifier 104. The differential amplifier 104 feeds a pair of comparators 106 and 108 coupled to a wall control microcontroller 110, in this embodiment a Microchip PIC 16505. The sensor 100 changing signals from the comparators when the infrared illumination changes at the passive infrared sensor 100. The microcontroller 110 provides an output at line 112 to the line 62, which is connected to the microcontroller in the GDO head. Also associated with the wall control is a momentary contact light switch 120, a door control switch 122, a vacation switch 124, and an auto-manual select switch 126. The light switch 120 is connected through a capacitor 130 to other portions of the wall control 60. The vacation switch 124 is connected through a capacitor 132 to the wall control 60. The capacitor 132 has a different value than the capacitor 130. The wall control 60 controls the microcontroller 56 through its switches by the effective pulse width or charging time required when a respective switch closes as governed by its associated capacitor or by the direct connection, as is set forth for the door control switch 122.

In addition, an ambient light sensor 140 is provided connected in a voltage divider circuit having a variable resistance 134 which feeds a comparator 150 which supplies an ambient light level signal over a line 152 to the microcontroller 110.

In addition, the microcontroller 110 supplies a setpoint signal on a line 160 back to the comparator 150 so that the microcontroller 110, through the use of pulse width modulation, can control the setpoint of the light level comparator 150 to determine the point where the ambient light comparator 150 trips and thereby determine the ambient light illumination level. FIGS. 5–11 are various views of the wall control 60 discussed above. FIGS. 12A–H are flow charts showing details of a program flow controlling the apparatus of microcontroller 56 contained within the wall control 60 as shown in FIGS. 3A–C.

As may best be seen in FIG. 12 when the processor or microcontroller 110 powers up ports and outputs are set as well as the timer in a step 500 at which point a main loop is entered and the timer is read in a step 502. A test is made to determine if 10 milliseconds have elapsed in step 504 if they have not, control is transferred back to step 502. If they have, the pulse width modulation cycle is cleared in a step 506 in order to start the pulse width modulation to govern the setpoint for the illumination. In step 508, the pulse width modulation output is turned on and the pulse width modulation counter is cleared. In step 510, the pulse width modulation counter is incremented and a test is made to determine whether the pulse width modulation counter is equal to the pulse width modulation value in a step 512. If it is not, control is transferred to step 510. If it is, control is transferred to a step 514 where the pulse width modulator has the counter cleared and is turned off and the pulse width modulation value is output. Followed by a step 516 where the pulse width modulation counter is incremented and a test is made to determine whether the value of the pulse width modulation counter is equal to pwm rem in a step 518. If it is not, control is transferred back to step 516.

Figure 12A:
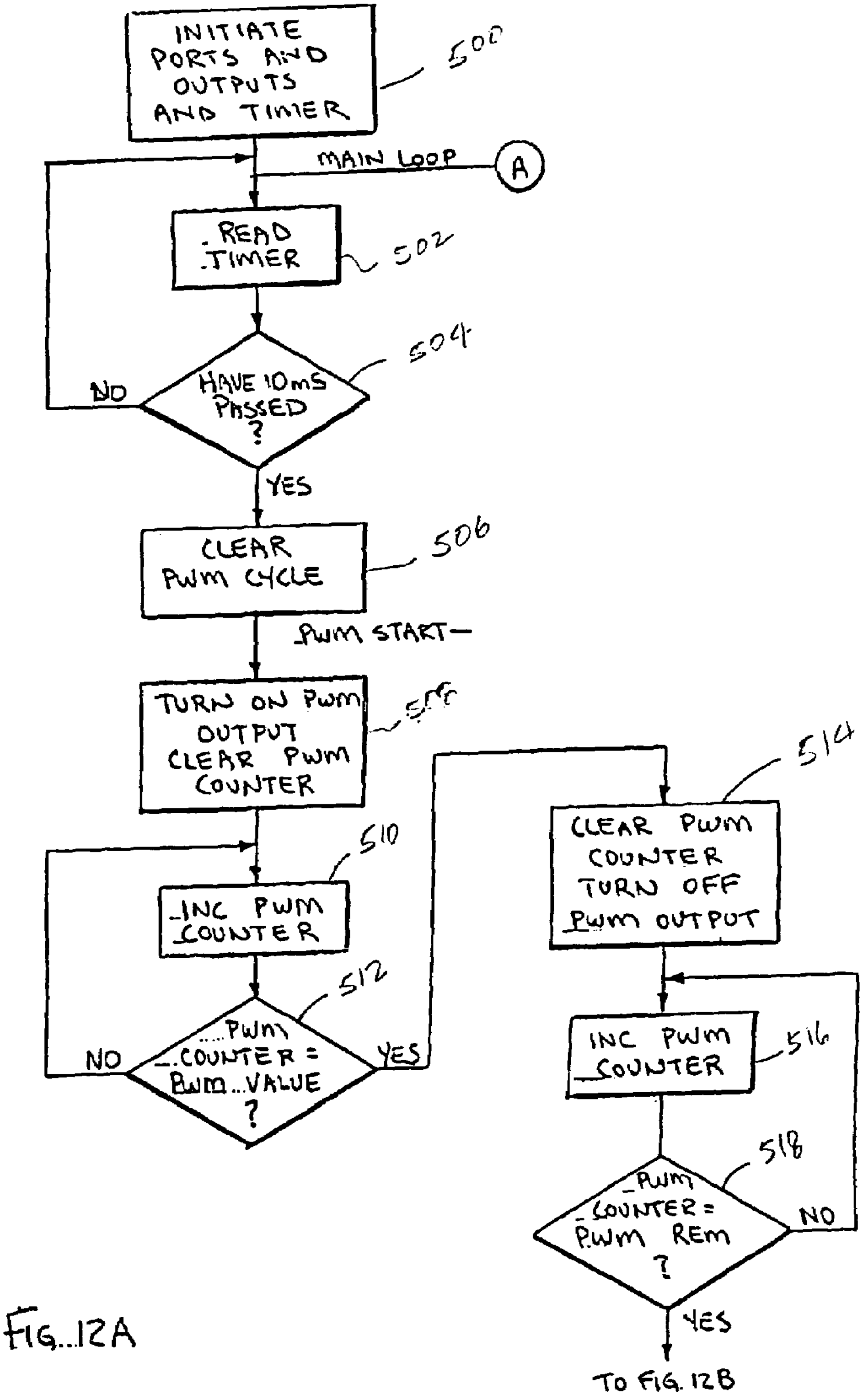
FIGS. 12A–H are flow charts showing details of a program flow controlling the operation of a microcontroller contained within the wall control as shown in FIGS. 3A–C.
Figure 12B:
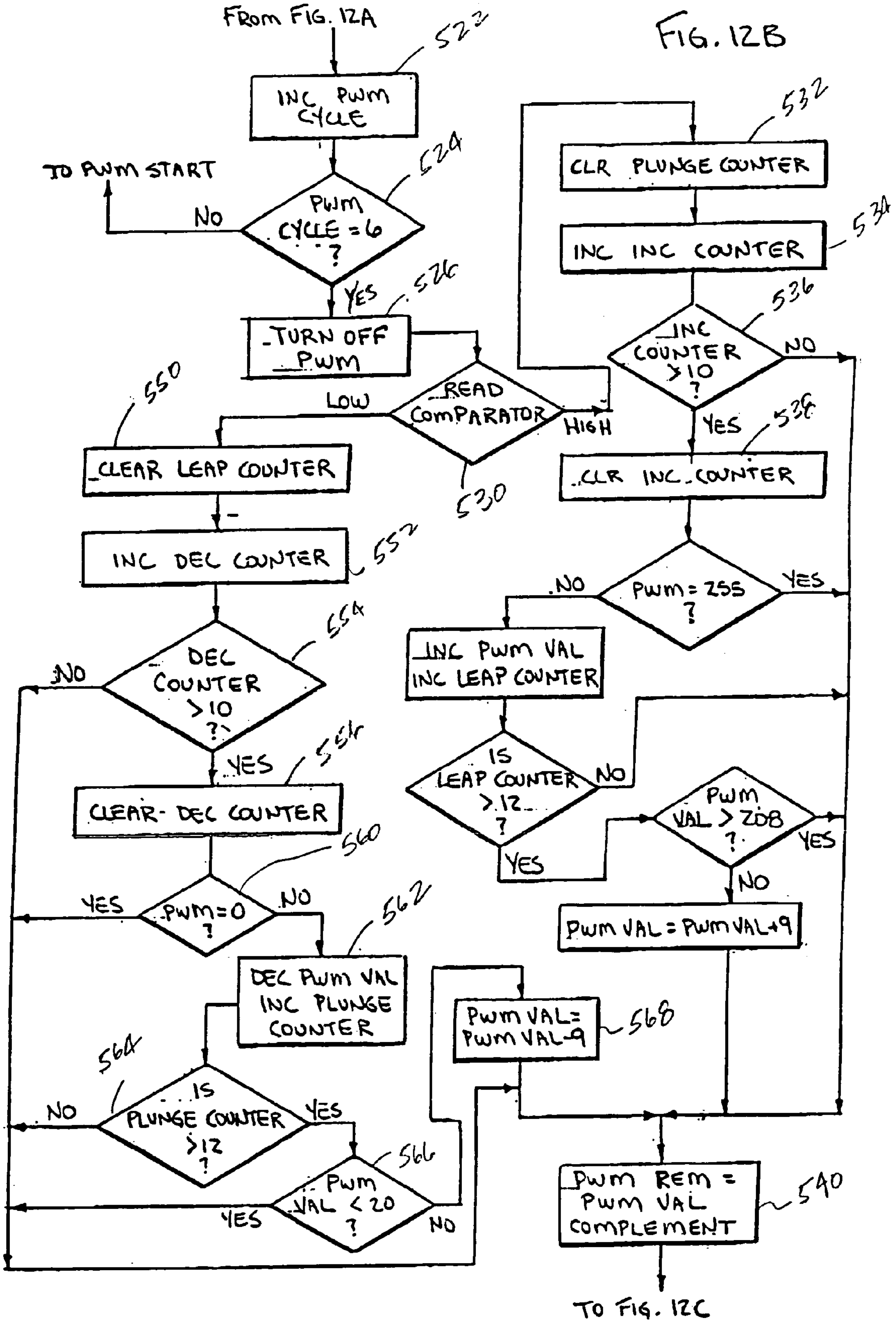

If it is, as may best be seen in FIG. 12B, the pulse width modulation cycle is incremented in a step 520, and a test is made in step 522 to determine whether it is equal to six. If it is not, control is transferred back to step 508 to restart the pulse width modulation. If it is, the pulse width modulator is turned off in step 526 and a read comparison is made in a step 530. If the read comparator is high, the plunge counter is decremented in a step 532, and the increment counter is incremented in a step 534. In a step 536, the value of the incremented counter is tested to determine whether it is greater than 10. If it is, the counter is cleared and a step 538. If it is not, control is transferred to a step 540 where the pulse width remainder value is set equal to pulse width modulation value compliment.

In the event that the value of the read comparison step 530 yields a low value, a leap counter is cleared in a step 550 and a decrement counter is incremented in a step 552. A test is made in a step 554 to determine whether the decrement counter value is greater than 10. If it is not, control is passed to step 540. If it is, the decrement counter is cleared in a step 556 and a test is made to determine whether the pulse width modulation value is zero in a step 560. If it is zero, control is transferred to step 540. If it is not, the pulse width modulation value is decremented, the plunge counter is incremented in a step 562. In a step 564, the plunge counter is tested to determine whether it is greater than 12. If it is, the pulse width modulation value is tested for whether it is less than 20 in a step 566. If it is not, the pulse width modulation value is set equal to the pulse width modulation value minus nine in a step 568 and control is transferred to the step 540.

Figure 12C:
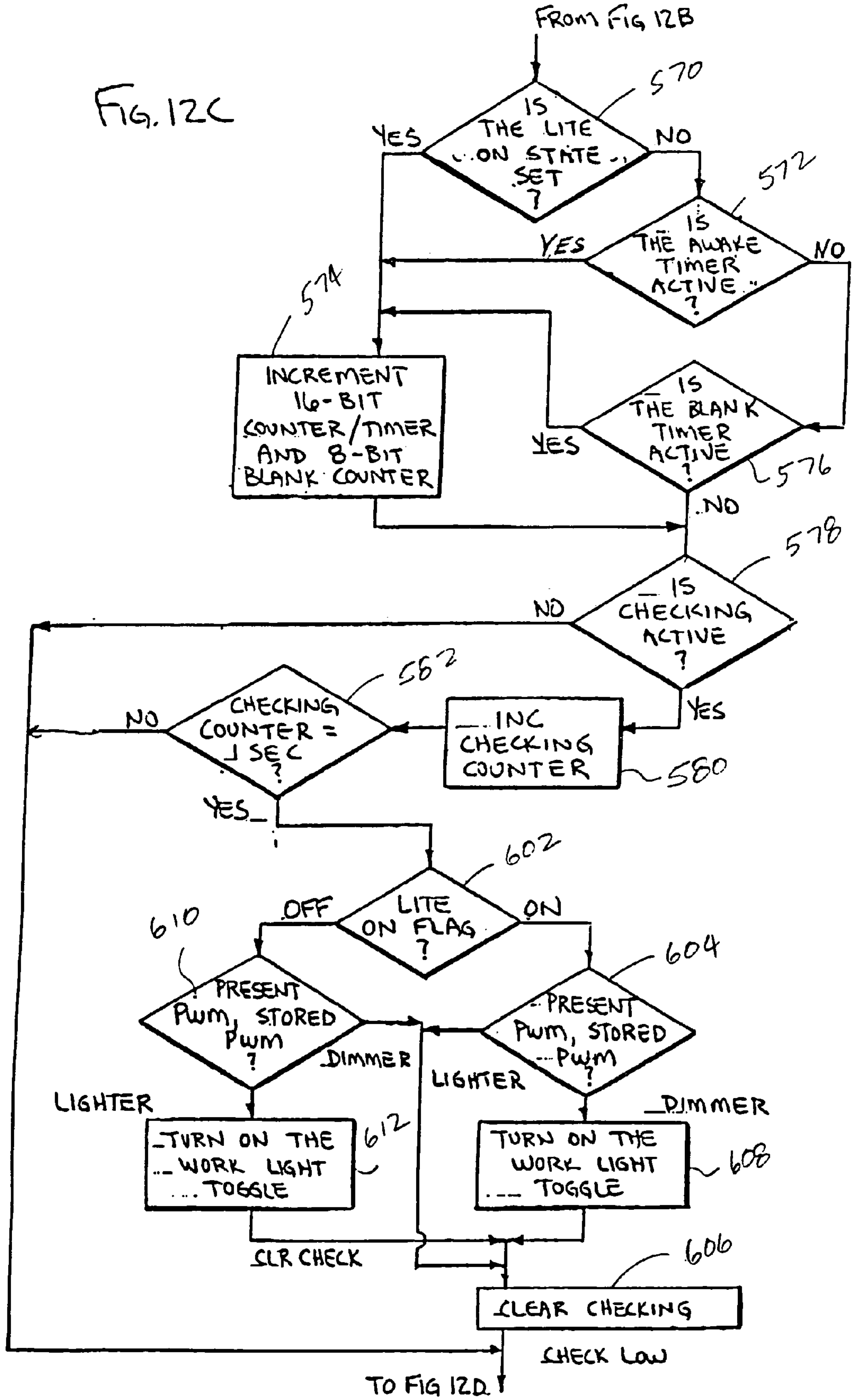
Figure 12D:
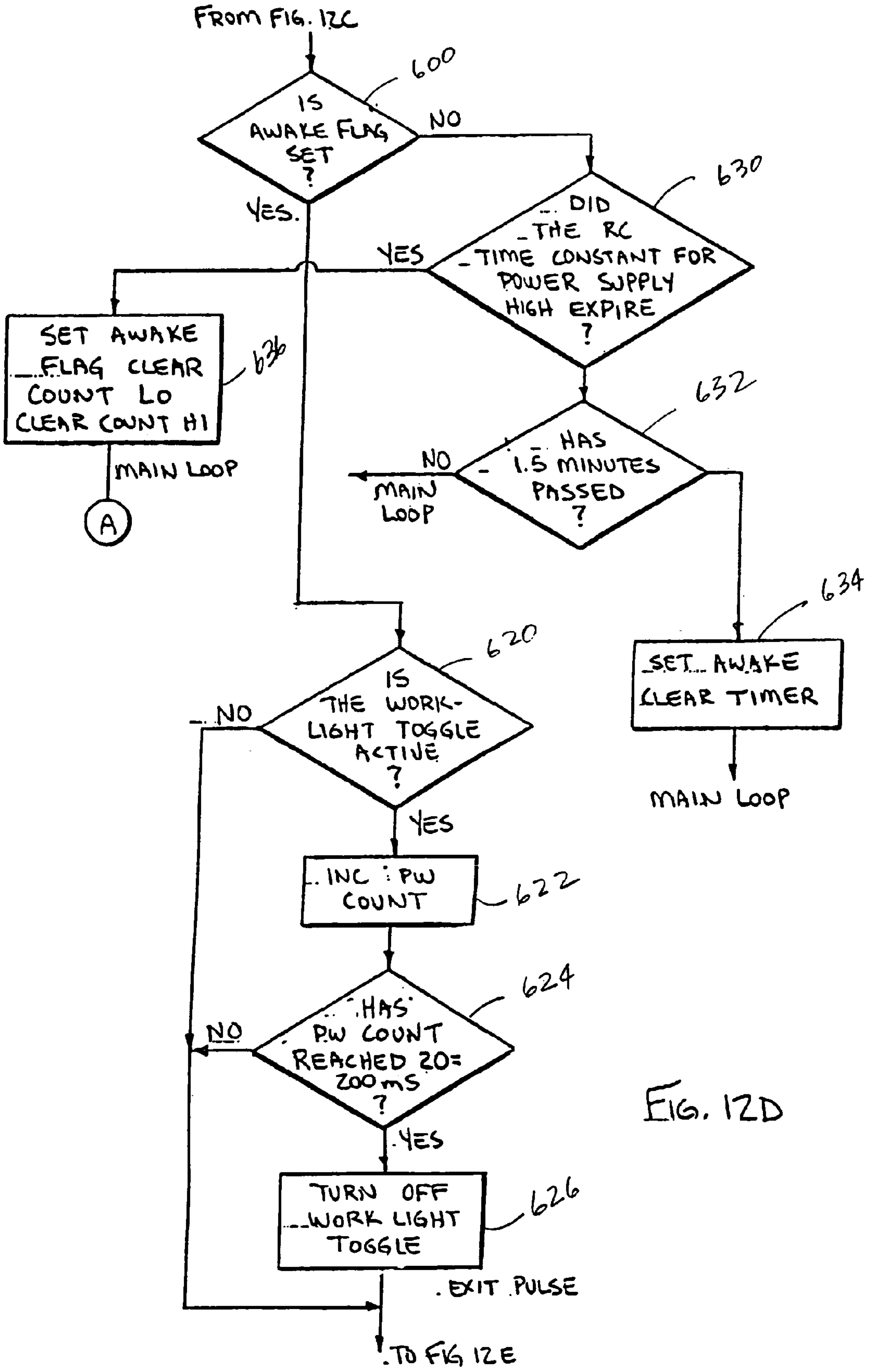
Figure 12E:
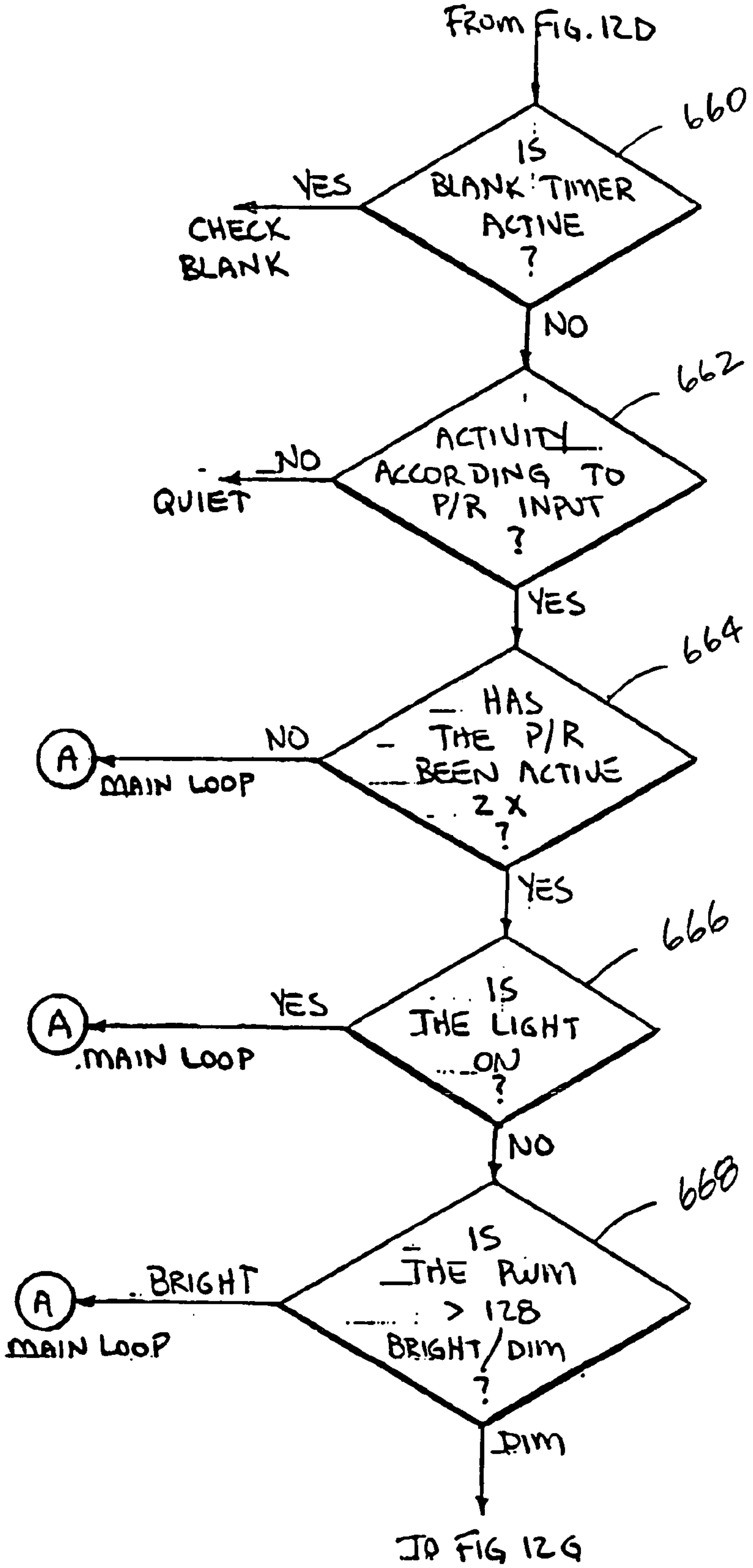

Upon exiting the step 540, as may best be seen in FIG. 12C, a test step 570 is entered to determine whether the light on state has been set by the head unit of the movable barrier operator. If it is not, a test is made in a step 522 to determine whether the awake timer is active. If the awake timer is active, control is transferred to a step 574 causing a 16-bit counter timer to be incremented and to blank any bit counter. If the timer is not active, control is transferred to determine whether the blank timer is active in a step 576. If it is, control is transferred to step 574. If it is not, control is transferred to a test step 578 to determine whether checking is active. If checking is active, the checking counter is incremented in the step 530 and a test is made to determine whether the value of the checking counter is equal to one second in a step 582. If it is not, control is transferred to a test step 600, as shown in FIG. 12D. If it is, a test is made to determine whether the light-on flag is on or not in a step 602. If it is on, a test is made in a step 604 to determine whether the present pulse width modulation value is equal to the stored modulation value. If it is indicated to be lighter, control is transferred to a step 606 to clear checking. If it is indicated to be dimmer, control is transferred to a step 608 causing the work light signal to e toggled by the wall control over the lines connected to the head unit. If the light-on value flag is indicated to be off, a test is made in a step 610 to determine whether the present pulse width modulation value is equal to the stored value. If it's indicated to be dimmer, control is transferred to the step 606. If it's indicated to be lighter, step 612 turns on the work light toggle to flip the light state and transfers control to step 606.

Once the light has been toggled, a test is made in step 600, as shown in FIG. 12D, to determine whether the awake flag has been set. If it has, a test is made in a step 620 to determine whether the work light toggle is active. If it is, the pulse width value is incremented in a step 622, and a test is made to determine whether the pulse width count is equal to 20 (which is equivalent to 200 milliseconds) in a step 624. If it is not, the work light is toggled off in a step 626. In the event that the awake flag has not been set, a test is made in a step 630 to determine whether the RC time constant for the power supply has expired. In other words, has the power been kept high for more than 1.5 minutes as tested for in step 630. If it has not, control is transferred back to the main loop in FIG. 12A. If it is, the awake value is set and the timer is cleared in the step 634, and control is transferred back to the main loop. In the event that the time constant has expired in step 630, the awake flag is cleared and the counts are set high in the step 636 after which control is transferred back to the main loop. After the work light has been toggled and the step 626, a step is made in a step 660, as may best be seen in FIG. 12E to determine if the blank timer is active. If it is, it is checked. If it is not, a test is made to determine whether there is indicated to be activity from the passive infrared input indicating a change in a step 662. If not, a quiet state is entered. If the PIR has been indicated to be active, a second test is made to determine whether the PIR still indicates that it is changing to indicate that a false signal has not been received. If it is, a test is made to determine whether the work light is on within the garage. If the work light is on, control is transferred back to the main loop. If the work light is indicated not to be on, a test is made to determine whether the pulse width value is greater than 128, in other words, whether the garage is indicated to be bright or dim. If it is indicated to be bright, indicating it's illuminated control is transferred back to the main loop. If it's indicated to be dim, control is transferred to the test step 680, as may best be seen in FIG. 12G to determine whether two-and-one-half seconds had elapsed. If they have not, the blank timer is turned off in the step 682. If they have, a test is made in the step 684 to determine whether the light-on state has been set. If it has, a test is made in a step 686 to determine whether six minutes have passed. If they have, the timer is cleared, the light-on flag is cleared, the blank flag is set, and an attempt is made to read the light state from the head unit via serial communication in a step 688. A test is made in a step 690 to determine whether the serial communication has been successful. If it has, a test is then made in a step 692 to determine whether the light-on flag has been returned from the head unit to the wall control. If it has, indicating the light has been set on, the toggle output is set in a step 694. If it has not, control has been transferred to the main loop. If serial communication has failed, as tested for in step 690, the toggle output is set in a step 700, pulse width modulated value is stored in a step 702, and checking is set in a step 704 prior to transfer back to the main loop.

Figure 12F:
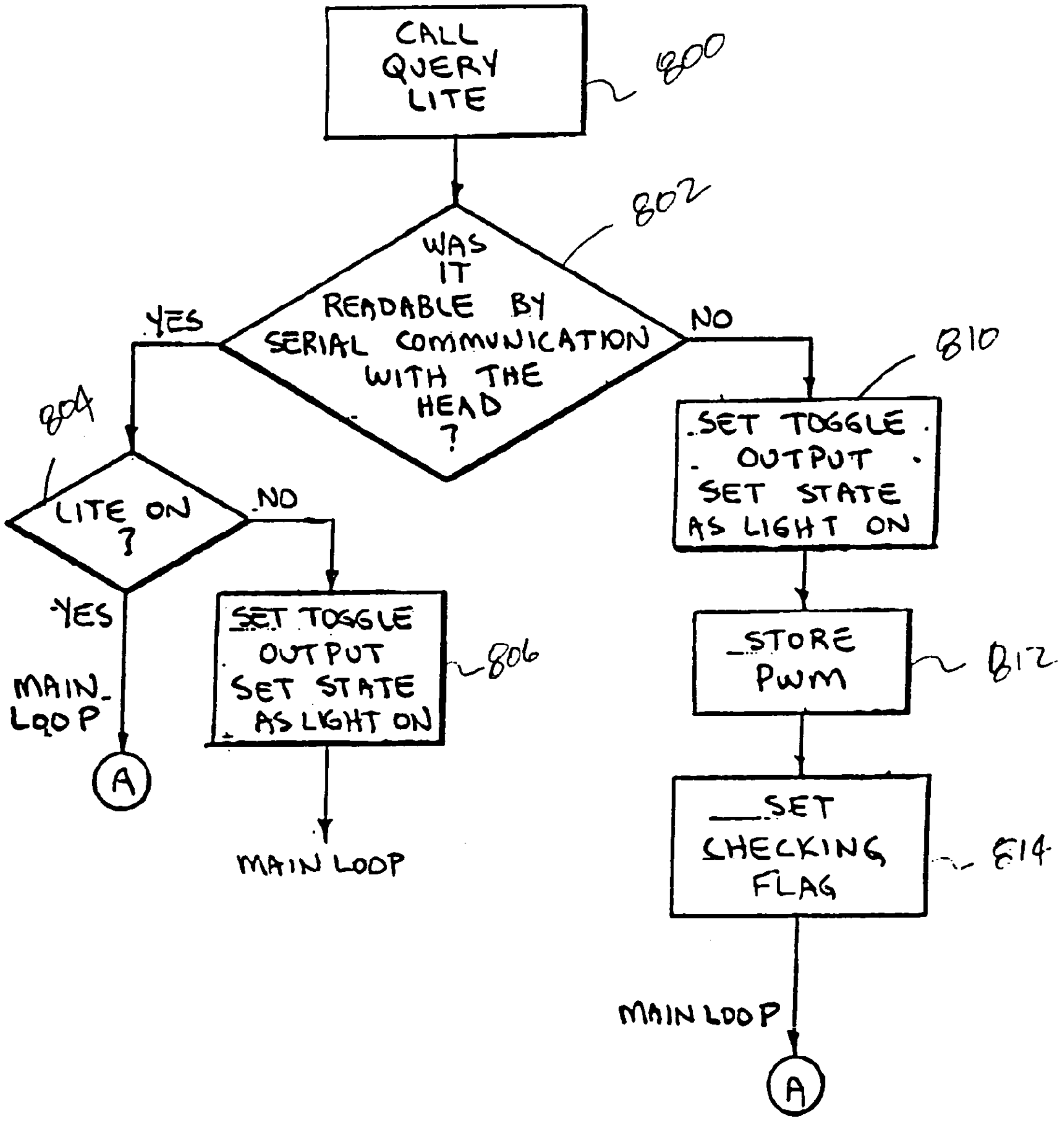
Figure 12G:
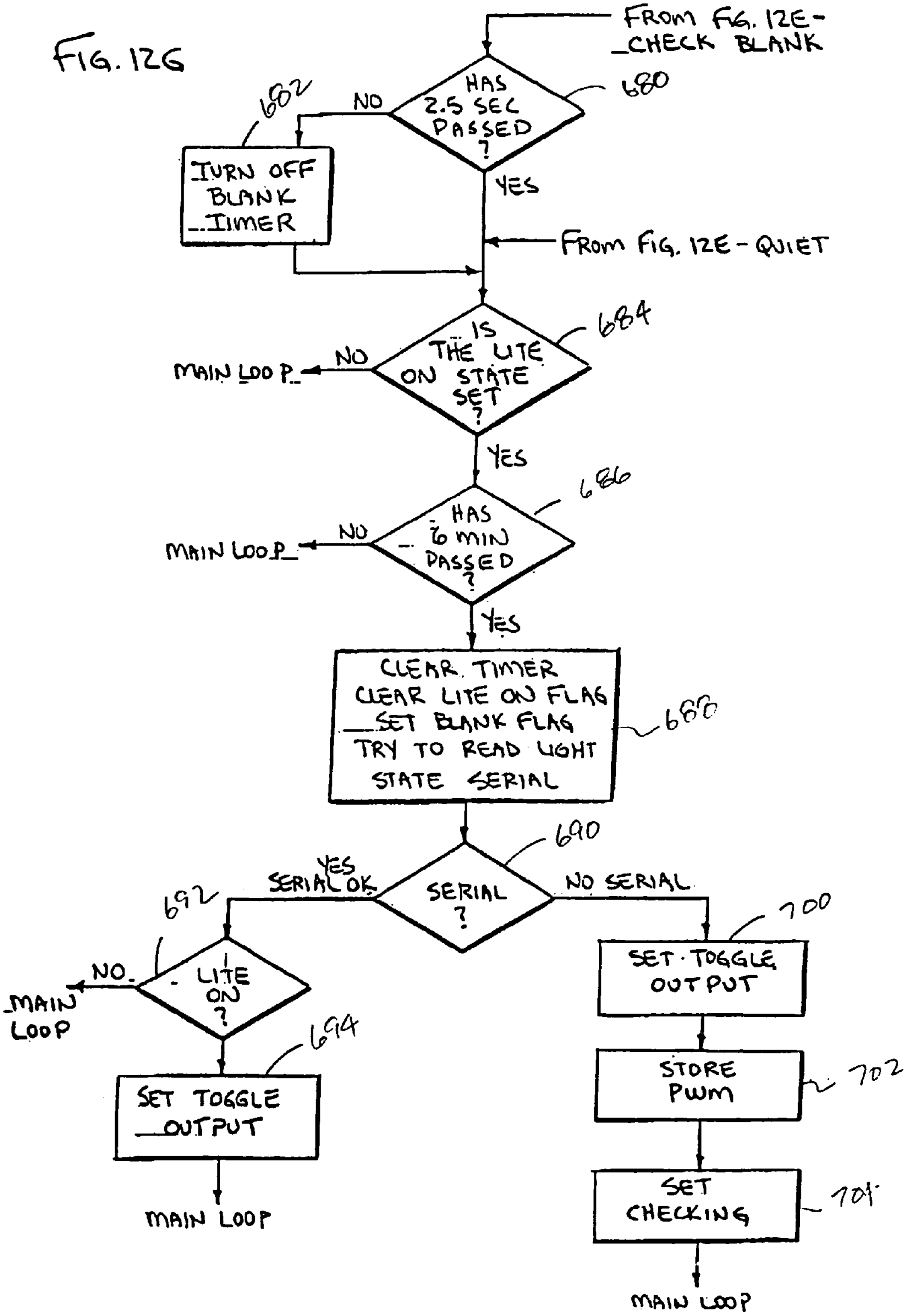
Figure 12H:
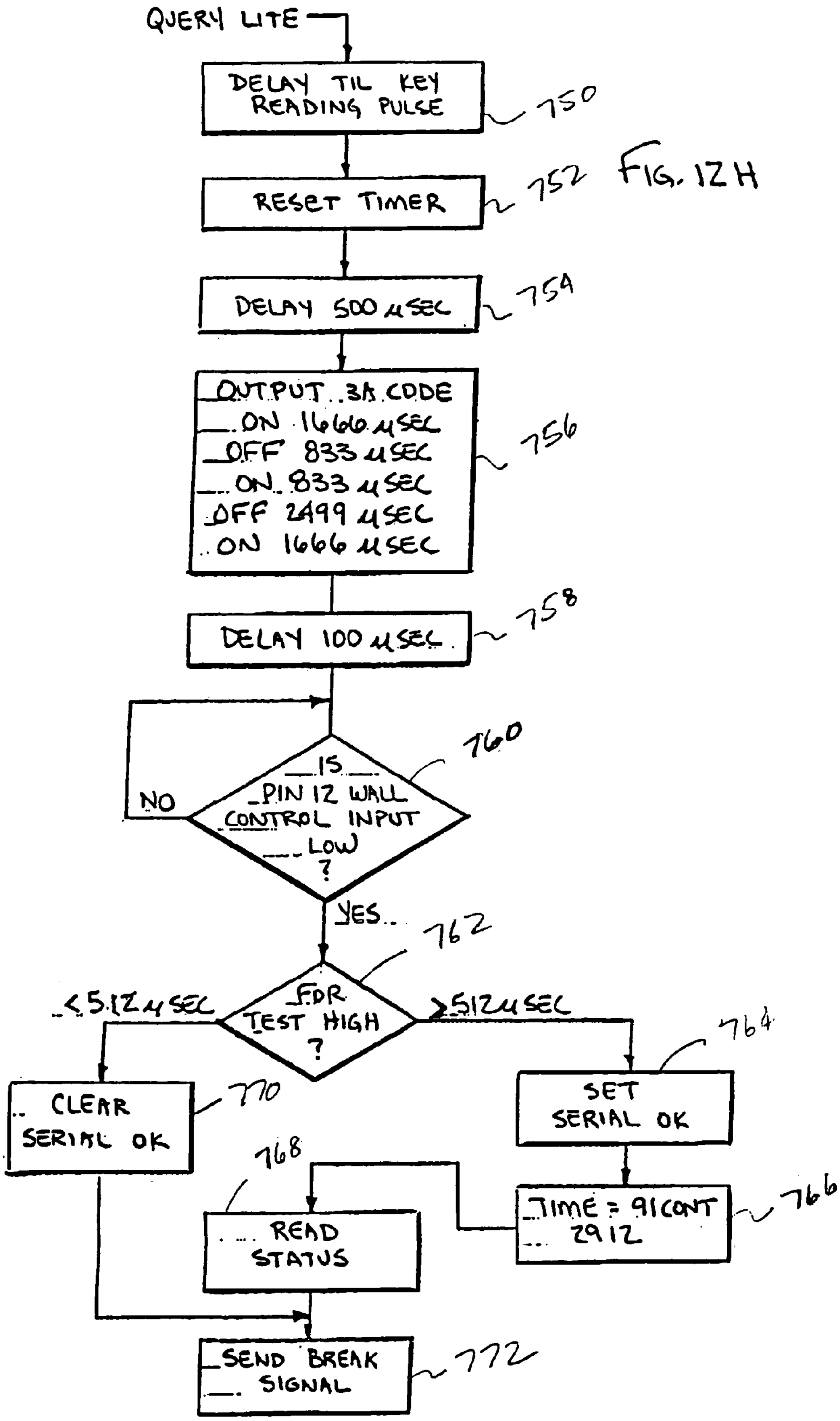

In order to respond to the query function, which is used to interpret the word sent back by the head unit, as may best be seen in FIG. 12H. In a step 750, there is a delay until a key reading pulse in a step 752 and a timer is reset in a step 754. A 500 microsecond delay is waited for in a step 756. A series of delays are used to generate an on-off output code of varying pulse widths followed by a 100 microsecond delay in a step 758. A test is then made in a step 760 to determine whether the wall control input pin is low. If it is not, the test is remade. If it is, control is transferred to a step 762 to set a flag indicating serial communication is successful. A time value is set is a step 766 and status is read in a step 768. A test is made in step 770 to determine whether the serial is okay and in a test 772 a brake signal is tested for and sent.

In order to respond to the query light, as is shown in FIG. 12F, in a step 800 the query light is called. A test is made in a step 802 to determine whether it was readable by a serial communication with the head. If it was, a test is made in a step 804 to determine whether the light was on. If it was, control is transferred back to the main loop. If it was not, the toggle output is set to indicate that the state was light-on in step 806 to force the light to be on.

In the event that the serial communication was not readable, the toggle output state was set, it's light on in step 810, pulse width modulation value restored in the step 812, and the checking flag is set in the step 814. Attached is an Appendix consisting of pages A-1 to A-12 which comprises a listing of the software executing on the microcontroller 110.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. An improved garage door opener comprising a motor drive unit for opening and closing a garage door, said motor drive unit having a microcontroller and a wall console, said wall console having a microcontroller, said microcontroller of said motor drive unit being connected to the microcontroller of the wall console by means of a digital data bus.

2. The garage door opener according to claim 1 wherein said digital data bus is asynchronous.

3. The garage door opener according to claim 1 wherein at least one microcontroller controls the travel of said door and said one microcontroller makes calculations of the door's location during its travel.

4. The garage door opener according to claim 1 further comprising a keypad for operating the garage door opener and wherein said keypad is provided with a switch to turn on or off a light in the motor drive unit in the garage.

5. The garage door opener according to claim 1 comprising apparatus at the wall console for requesting the status of the drive unit via the data bus.

6. The garage door opener according to claim 5 comprising apparatus at the drive unit for responding to status requests from the wall console via the data bus.

7. The garage door opener according to claim 1 wherein power for the wall console is provided from the drive unit via power conductors of the data bus.

8. The garage door opener according to claim 7 wherein the power conductors convey both data and power.

9. An improved garage door opener comprising a motor drive unit for opening and closing a garage door, said motor drive unit having a controller and a wall console, said wall console having a controller, said controller of said motor drive unit being connected to the controller of the wall console by means of a digital data bus.

10. The garage door opener according to claim 9 wherein said digital data bus is asynchronous.

11. The garage door opener according to claim 9 wherein at least one controller controls the travel of said door and said one microcontroller makes calculations of the door's location during its travel.

12. The garage door opener according to claim 9 further comprising a keypad for operating the garage door opener and wherein said keypad is provided with a switch to turn on or off a light in the motor drive unit in the garage.

13. The garage door opener according to claim 9 comprising apparatus at the wall console for requesting the status of the drive unit via the data bus.

14. The garage door opener according to claim 13 comprising apparatus at the drive unit for responding to status requests from the wall console via the data bus.

15. The garage door opener according to claim 9 wherein power for the wall console is provided from the drive unit via power conductors of the data bus.

16. The garage door opener according to claim 15 wherein the power conductors convey both data and power.

* * * * *